United States Patent
Obara et al.

[11] Patent Number: 5,945,824
[45] Date of Patent: Aug. 31, 1999

[54] LINEAR MOTION ROLLING GUIDE UNIT WITH DETECTION DEVICE

[75] Inventors: Kouji Obara; Takaaki Hagiya, both of Kanagawa, Japan

[73] Assignee: Nippon Thompson Co., Ltd., Tokyo, Japan

[ * ] Notice: This patent is subject to a terminal disclaimer.

[21] Appl. No.: 08/912,128

[22] Filed: Aug. 15, 1997

[30] Foreign Application Priority Data

Aug. 15, 1996 [JP] Japan ................................. 8-233590

[51] Int. Cl.$^6$ ........................... H02K 41/02; G01B 7/00; G01B 7/14; F16C 29/04
[52] U.S. Cl. ...................... 324/207.22; 310/12; 318/135; 324/207.2; 324/207.24
[58] Field of Search ............................ 324/207.2, 207.21, 324/207.22, 207.24; 310/12; 318/135, 687; 341/15; 384/43–45, 448

[56] References Cited

U.S. PATENT DOCUMENTS

| | | | |
|---|---|---|---|
| 3,505,576 | 4/1970 | Burkhart | 341/15 X |
| 4,792,788 | 12/1988 | Kumar | 341/15 |
| 5,023,495 | 6/1991 | Ohsaka et al. | 318/135 X |
| 5,047,676 | 9/1991 | Ichikawa | 318/135 X |
| 5,225,725 | 7/1993 | Shiraki et al. | 310/12 |
| 5,434,602 | 7/1995 | Kaburagi et al. | 341/15 X |
| 5,606,256 | 2/1997 | Takei | 324/207.24 X |
| 5,779,367 | 7/1998 | Obara | 324/207.24 X |

FOREIGN PATENT DOCUMENTS

3153915 7/1991 Japan.

*Primary Examiner*—Gerard Strecker
*Attorney, Agent, or Firm*—Sughrue, Mion, Zinn, Macpeak & Seas, PLLC

[57] ABSTRACT

This linear motion rolling guide unit is able to detect the relative positions and so forth of a track rail and slider by forming narrow grooves 21e in track rail 21 and arranging extremely narrow, linear scales 31 and 32 in those grooves. Thus, it is easy to reduce the size of this linear motion rolling guide unit, it is able to flexibly accommodate the particular conditions of use, and it is also inexpensive.

7 Claims, 11 Drawing Sheets

LINEAR MOTION ROLLING GUIDE UNIT WITH DETECTION DEVICE

BACKGROUND OF THE INVENTION

1. Field of the Invention

The present invention relates to a linear motion rolling guide unit, and more particularly, to a linear motion rolling guide unit equipped with a detection device that detects the relative position of a track rail and a slider.

2. Description of the Prior Art

Figure 1:
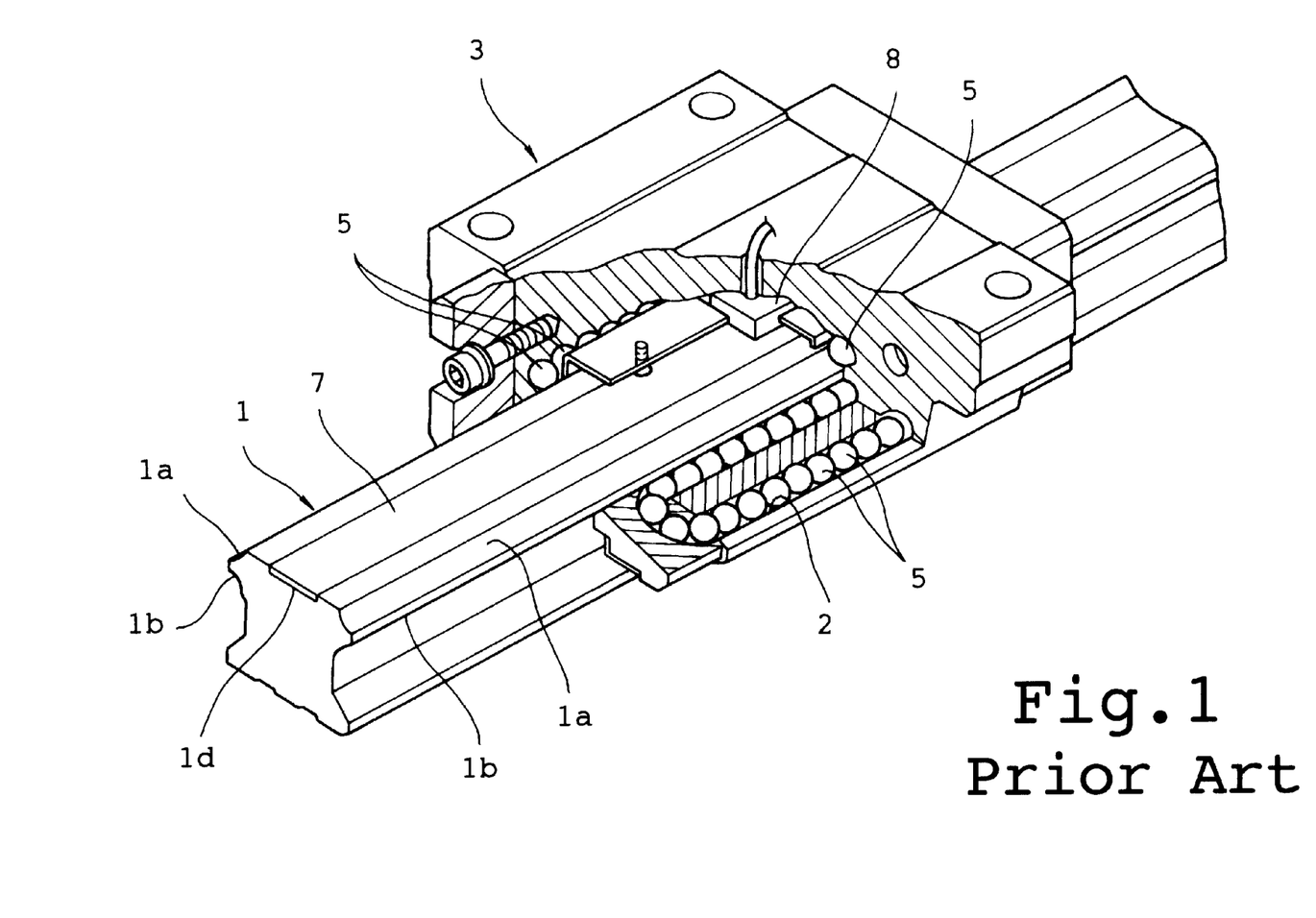
FIG. 1 is a perspective view, including a partial cross-section, of the essential portion of a linear motion rolling guide unit of the prior art.

An example of a linear motion rolling guide unit of the prior art is shown in FIG. 1. This linear motion rolling guide unit is disclosed in Japanese Laid-Open Patent Publication No. 3-153915.

As shown in FIG. 1, this linear motion rolling guide unit has track rail 1, in which tracks in the form of upper transfer surfaces 1a and lower transfer surfaces 1b are formed in the left and right shoulders along the lengthwise direction; slider 3 having four rolling element circulating paths 2 corresponding to each of these upper transfer surfaces 1a and lower transfer surfaces 1b, and which is able to move freely relative to track rail 1; and, a large number of rolling elements in the form of balls 5, which are arranged and contained within rolling element circulating paths 2, and bear the load between track rail 1 and slider 3 by circulating while rolling over the upper transfer surfaces 1a and lower transfer surfaces 1b accompanying the movement of the slider 3.

Attachment groove 1d is formed in the top of track rail 1 along its entire length, and a detected portion in the form of band-shaped scale 7 is arranged within this attachment groove 1d. This scale 7 is magnetized in a prescribed pattern along its lengthwise direction.

Magnetic head 8 is attached at a prescribed interval from and in opposition to scale 7 in slider 3. Magnetic head 8 emits a detection signal according to changes in the magnetic field. The relative positions of track rail 1 and slider 3 are detected based on detection signals from this magnetic head 8.

Scale 7 requires a somewhat large space to be provided on track rail 1 since it is of a band-shape and its surface area spreads, and selection of its installation site has little degree of freedom, thus creating a problem in terms of reducing the size of the linear motion rolling guide unit.

SUMMARY OF THE INVENTION

The object of the present invention is to provide a linear motion rolling guide unit that can easily be reduced in size, is able to flexibly accommodate the conditions of use, and is inexpensive.

In addition, another object of the present invention is to provide a linear motion rolling guide unit that is able to demonstrate other effects.

The linear motion rolling guide unit as claimed in the present invention is equipped with: a track rail in which tracks are formed along the lengthwise direction; a slider having rolling element circulating paths that include load bearing tracks corresponding to the tracks, and which is able to move freely relative to the track rail; and, a plurality of rolling elements that are arranged and contained within the rolling element circulating paths, and bear the load while rolling over the tracks; wherein, a plurality of grooves parallel to the tracks are formed in the track rail, linear scales, in which a detected portion is formed that is magnetized by N and S magnetic poles in a prescribed pattern, are arranged in each groove, and detecting portions are provided in the slider comprised of magnetic sensors that correspond to each scale.

In addition, in the linear motion rolling guide unit of the present invention, the N and S magnetic poles of the scales are magnetized at a fine and mutually equal pitch and at the same locations for each scale, and the magnetic sensors corresponding to the scales are detecting portions able to detect position that are arranged mutually offset by a prescribed distance.

In addition, in the linear motion rolling guide unit of the present invention, the N and S magnetic poles of the scales are magnetized at a fine and mutually equal pitch mutually offset by a prescribed distance for each scale, and the magnetic sensors corresponding to the scales are detecting portions able to detect position that are arranged at the same locations.

In addition, in the linear motion rolling guide unit of the present invention, the detected portion provided on either one of the scales indicates the measuring reference and/or limits of the operating stroke of relative movement of the slider.

In addition, in the linear motion rolling guide unit of the present invention, the scales are arranged at two symmetrical locations on the track.

In addition, in the linear motion rolling guide unit of the present invention, the detecting portions are housed within the slider.

In addition, in the linear motion rolling guide unit of the present invention, the detecting portions are attached outside the slider.

DESCRIPTION OF THE PREFERRED EMBODIMENTS

The following provides an explanation of the embodiments of the present invention with reference to the drawings.

First, an explanation is provided of a linear motion rolling guide unit as a first embodiment of the present invention using FIGS. 2 through 7.

Figure 2:
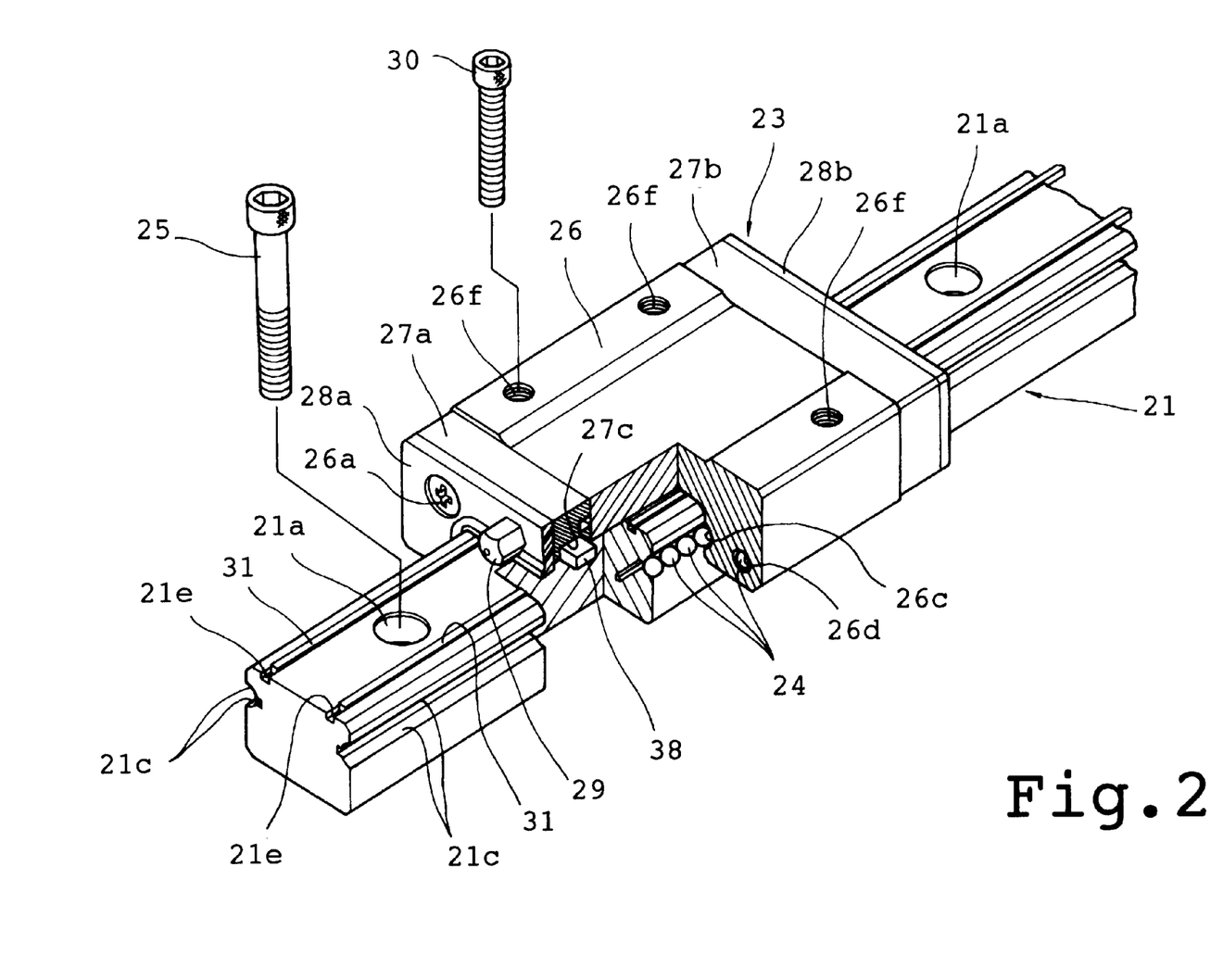
FIG. 2 is a perspective view, including a partial cross-section, of a linear motion rolling guide unit as a first embodiment of the present invention.
Figure 3:
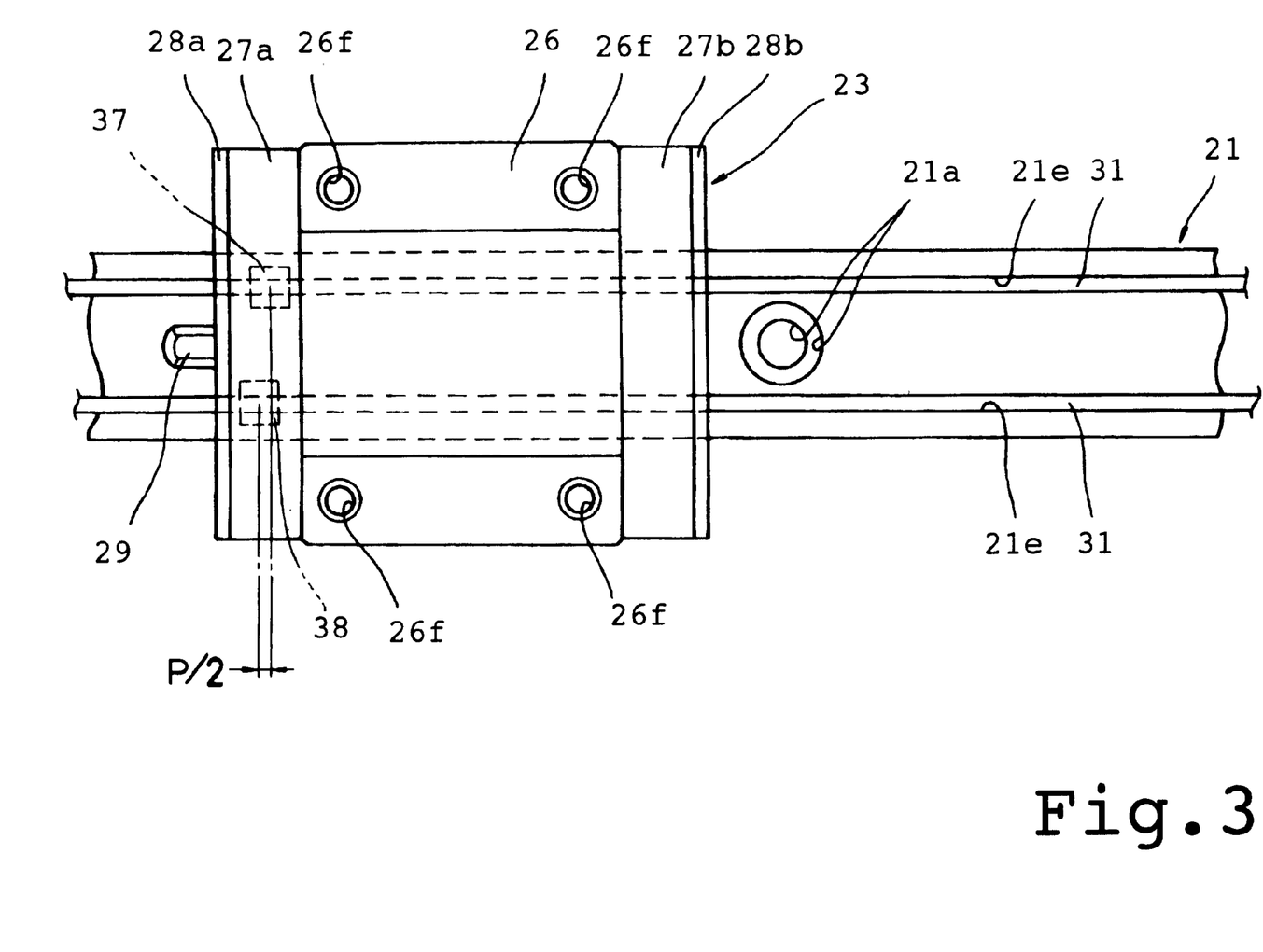
FIG. 3 is an overhead view of the linear motion rolling guide unit shown in FIG. 2.

As shown in FIGS. 2 and 3, this linear motion rolling guide unit has a track rail in the form of track rail 21, and a slider in the form of slide unit 23 that is able to move freely relative to this track rail 21.

Bolt insertion holes 21a are arranged in a row at an equal pitch in the lengthwise direction of track rail 21, and this track rail 21 is fastened on the work stand and so forth of a machine tool and so forth by bolts 25 (with hexagon sockets) that are inserted into bolt insertion holes 21a.

Figure 4:
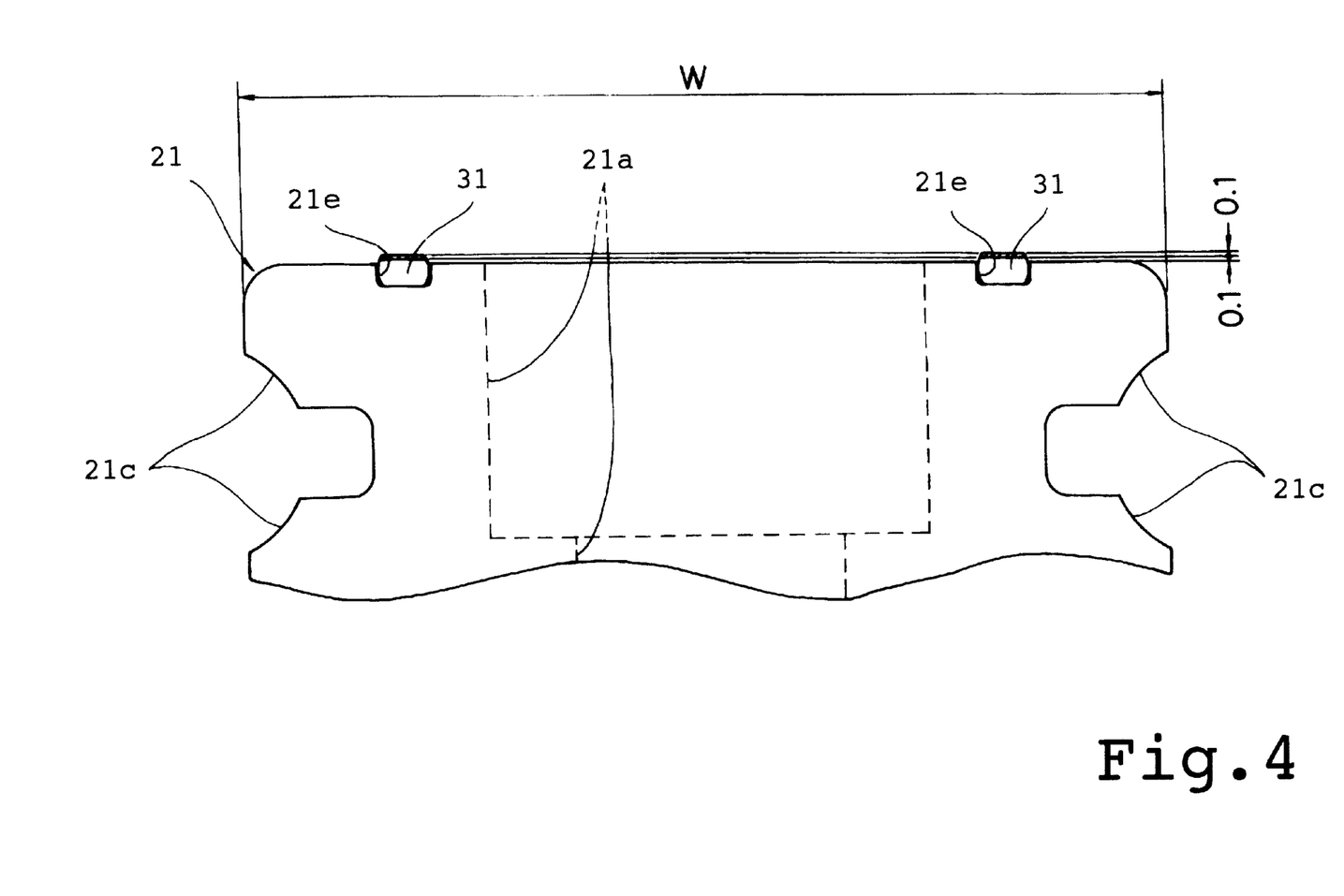
FIG. 4 is an enlarged view of a portion of the linear motion rolling guide unit shown in FIGS. 2 and 3.

As shown in FIGS. 2 and 4, tracks in the form of track grooves 21c are formed along the lengthwise direction in track rail 21 in its left and right shoulders. Two rolling element circulating paths are formed corresponding to track grooves 21c in slide unit 23, and a large number of rolling elements in the form of balls 24 (see FIG. 2) are arranged and contained within these rolling element circulating paths. These balls 24 circulate while rolling and bearing the load between track rail 21 and slide unit 23 along track grooves 21c accompanying relative movement of track rail 21 and slide unit 23.

As shown in FIGS. 2 and 3, slide unit 23 is composed of casing 26 straddled over track rail 21, a pair of end caps 27a and 27b fastened to both ends in the direction of progress of casing 26 by screws 26a, and end seals 28a and 28b fastened together with end caps 27a and 27b to the outer surfaces of end caps 27a and 27b with screws 26a.

As shown in FIG. 2, the rolling element circulating paths are composed of load bearing track groove 26c and return path 26d, which are formed mutually in parallel in casing 26, and a pair of semi-circular direction changing paths (not shown) formed in end caps 27a and 27b that connect the corresponding ends of load bearing track groove 26c and return path 26d. Load bearing track groove 26c corresponds to track groove 21c of track rail 21.

Furthermore, grease nipple 29 is attached to the end of slide unit 23 for supplying grease to each ball 24.

In addition, threaded holes 26f, for example four of them, are formed in casing 26 of slide unit 23, and a table not shown is fastened onto this casing 26 by bolts 30 (with hexagon sockets) (see FIG. 2) that screw into threaded holes 26f.

Grooves 21e are formed parallel to track grooves 21c at two symmetrical locations in, for example, the top of track rail 21. Linear scales 31 are respectively arranged in these grooves 21e by press fitting or adhesive and so forth.

Figure 5:
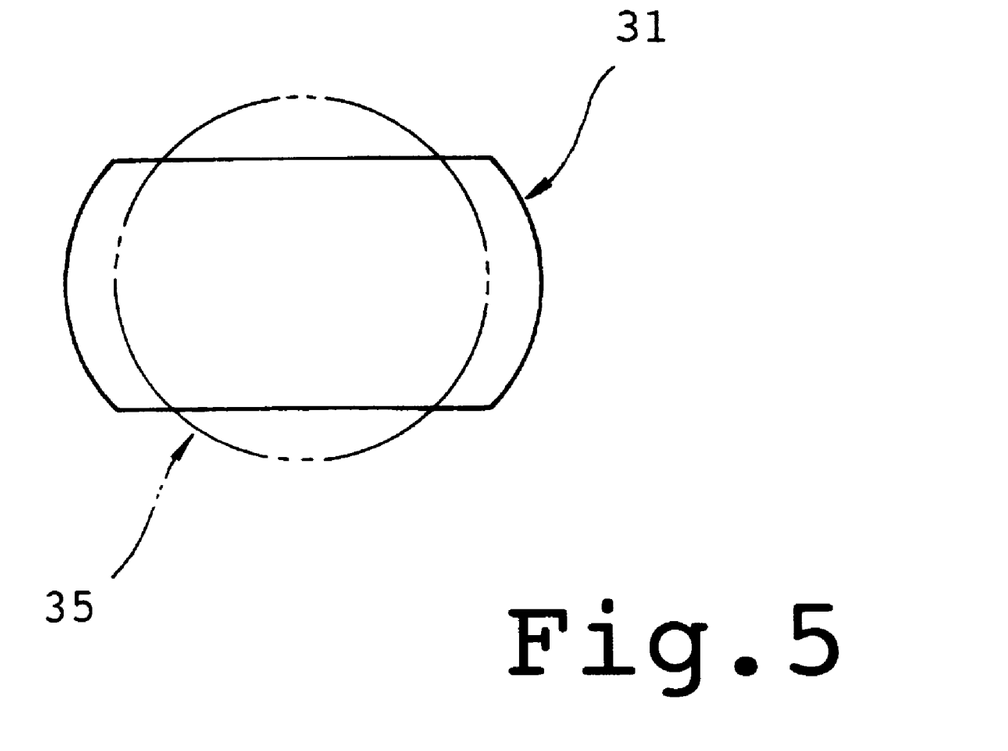
FIG. 5 is a front view of a scale equipped on the linear motion rolling guide unit shown in FIGS. 2 and 3.

These scales 31 are composed of a ferromagnetic material (such as Fe—Cr—Co). As shown in FIG. 5, scales 31 are comprised of wire 35 having a circular cross-section compressed into the shape of a flat wire. As shown in FIG. 4, grooves 21e are provided with slots to embed scales 31. Scales 31 protrude by, for example, 0.2 mm from these grooves 21e, after which these protruding portions are removed by grinding away only 0.1 mm (portion indicated with the hatching).

Furthermore, in FIG. 4, the dimension indicated with symbol W, namely the width of track rail 21, can be arbitrarily selected from a value of, for example, about 5 mm.

As shown in FIGS. 2 and 3, detecting portions 37 and 38 are provided in slide unit 23 corresponding to each scale 31. These detecting portions 37 and 38 are contained in groove 27c formed in the inside of slide unit 23 (end cap 27a), and are arranged separately from each scale 31 by a slight predetermined gap.

Figure 6:
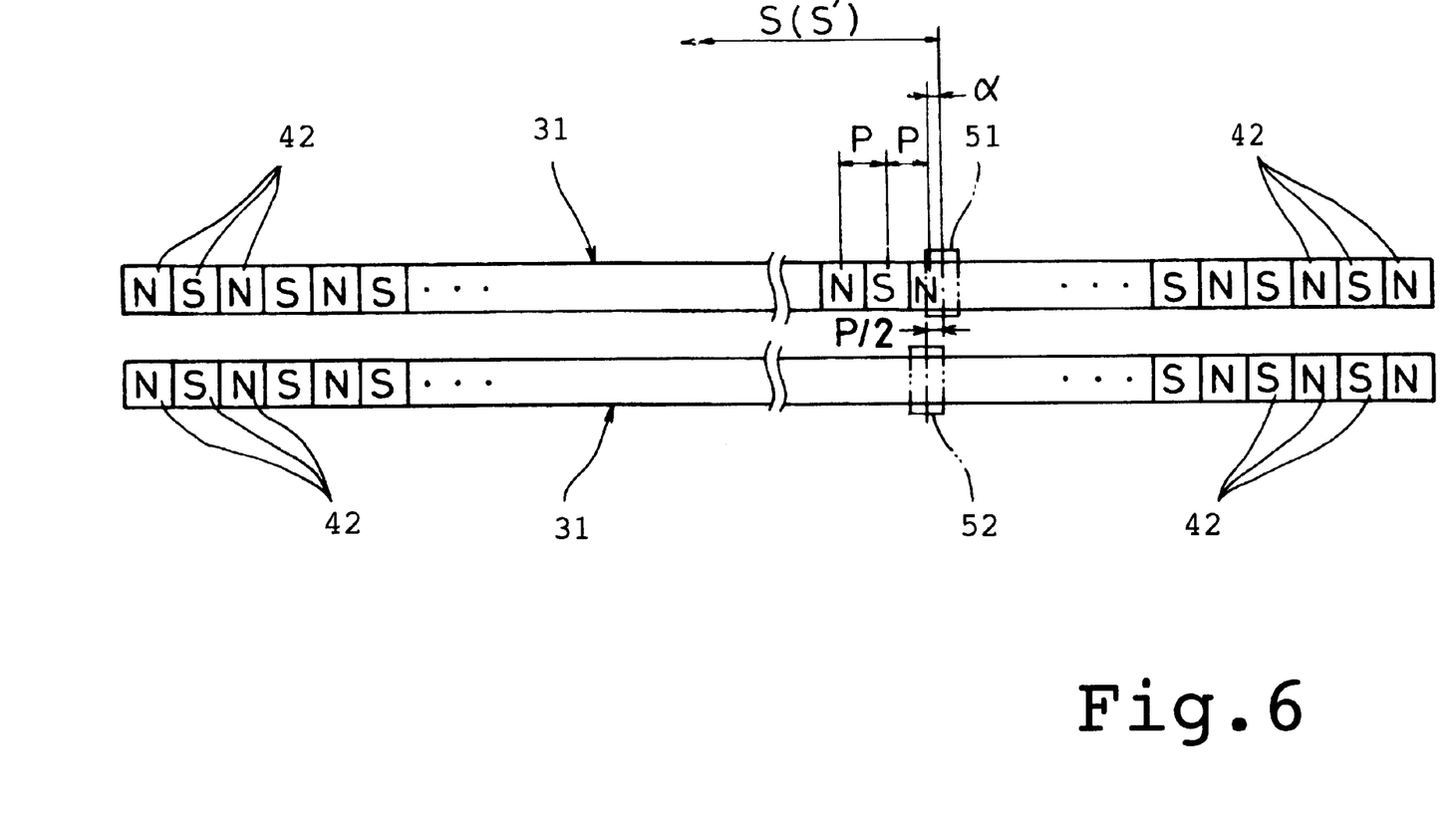
FIG. 6 is an overhead view showing a detection device equipped on the linear motion rolling guide unit shown in FIGS. 2 and 3.

FIG. 6 indicates the detected portions provided on each scale 31. These detected portions are magnetized by the prescribed pattern on a magnetic substance in the form of each scale itself.

As shown in the drawing, each scale 31 is magnetized by a large number of N and S magnetic poles at identical locations at a fine and mutually equal pitch along its lengthwise direction. In the drawing, these magnetic poles are indicated with reference numeral 42. These magnetic poles 42 are for detecting position and determining the direction of relative movement.

In addition, detecting portions 37 and 38 provided in slide unit 23 for detecting the detected portions are equipped with magnetic sensors 51 and 52 shown in FIG. 6, and more specifically, electromagnetic conversion devices composed of Hall effect elements and so forth.

Figure 7:
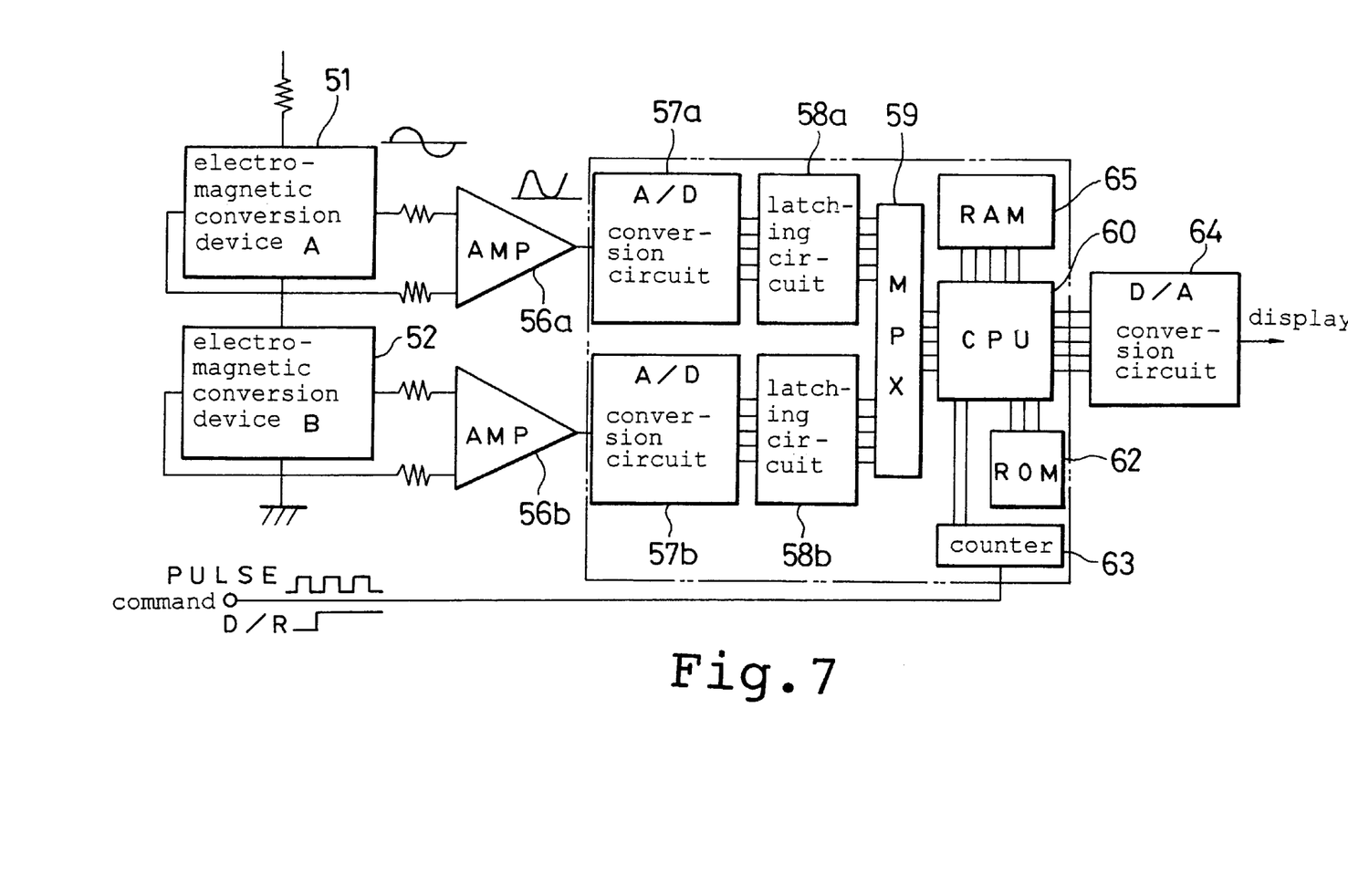
FIG. 7 is a block diagram showing the control system relating to the linear motion rolling guide unit shown in FIGS. 2 and 3.

As shown in FIG. 6, electromagnetic conversion devices 51 and 52 are respectively arranged mutually offset by a prescribed distance of ½ of pitch P between magnetic poles in the direction of arrangement of magnetic poles 42 which they are to respond. As a result, the signal waveforms from both electromagnetic conversion devices 51 and 52 are shifted out of phase by $\pi/2$. Continuous positive and negative waves based on a 0 level are obtained by the waveforms obtained from these electromagnetic conversion devices 51 and 52. These waves are then amplified from the 0 level to the Vmax level by passing through amplification circuits 56a and 56b as shown in FIG. 7. This is done to facilitate signal processing in a latter stage.

Next, an explanation is provided of the constitution of a control system used to determine relative positions of track rail 21 and slide unit 23 based on the detection signal emitted by a detection device composed of the detected portions and detecting portions.

As shown in FIG. 7, the output waveforms from electromagnetic conversion devices 51 and 52 are input to amplification circuits 56a and 56b. The output terminals of these amplification circuits 56a and 56b are sequentially connected to A/D conversion circuits 57a and 57b, latching circuits 58a and 58b, and multiplexer (MPX) 59. The output of this multiplexer 59 is then input to CPU (control circuit) 60. Memory (ROM) 62, a counting device in the form of up-down counter 63, and D/A conversion circuit 64 are connected to CPU 60.

A/D conversion circuits 57a and 57b convert the analog waveforms amplified by amplification circuits 56a and 56b of the previous stage to binary data, after which the respective data is input to latching circuits 58a and 58b. These latching circuits 58a and 58b latch and hold the data of A/D conversion circuits 57a and 57b of the previous stage in order to synchronously process the data converted by A/D conversion circuits 57a and 57b every moment.

This held data is then input to multiplexer 59. Since this multiplexer 59 is unable to simultaneously output the data latched by latching circuits 58a and 58b in the case of output to CPU 60 in the following stage, time sharing processing is performed so that data is separately output to CPU 60 where arithmetic processing is performed.

Next, an explanation is provided regarding the arithmetic processing of CPU 60.

First, as the initial operation, a reference position signal is emitted from a reference position detection device not shown as a result of slide unit 23 being driven and moved to the reference position (or conversely, by slide unit 23 remaining stationary and track rail 21 moving to the reference position). Scale position data stored in memory (RAM) 65 (see FIG. 7) is reset corresponding to this reference position signal. Slide unit 23 then begins to move towards the desired position according to this reset command. Amplified continuous waveforms having mutually different phases are obtained from electromagnetic conversion devices 51 and 52 corresponding to this movement.

Since the output waveforms of electromagnetic conversion devices 51 and 52 are of different phases, CPU 60 is able to determine the direction of movement of slide unit 23 by comparing this differing waveform data.

Next, an explanation is provided regarding the amount of movement of slide unit 23.

If the amount of movement of electromagnetic conversion elements 51 and 52 corresponding to each of scales 31 is taken to be S in FIG. 6, then this becomes the amount of movement of slide unit 23.

With respect to calculation of this amount of movement, the output of electromagnetic conversion device 51 is taken to be VA, and that of electromagnetic conversion device 52 is taken to be VB to determine the ratio of their voltage VA/VB.

Since fine position data within a period (P×2) corresponding to VA/VB is stored in advance within memory 62, CPU 60 is able to determine distance α shown in FIG. 6 by reading the value that coincides with the value of VA/VB determined from the arithmetic processing described above and comparing that value. Since position data that was previously determined is already stored in memory 65 (although not stored in memory when written from the reference position for the first time), CPU 60 reads this data, adds it to the most recently determined distance α, and distance S calculated as a result of this processing is written into memory 65 as new position data. This position data is then displayed with a display circuit not shown (indicated with the word "display" in FIG. 7), enabling determination of relative position.

Since narrow linear scales 31 are used in this linear motion rolling guide unit, the space occupied by scales 31 is small, there is a greater degree of freedom when selecting the installation site, and the overall size of the linear motion rolling guide unit can easily be reduced. Since the scales are of a linear shape in particular, they can be installed on track rail 21 easily.

In addition, since linear scales 31 are arranged in grooves 21e provided in track rail 21, curvature of scales 31 can be repressed by forming grooves 21e with high precision, thereby enabling them to ensure their accuracy as scales.

In addition, since a plurality, in this case two, scales are provided at different positions, and detecting portions 37 and 38 are provided separately corresponding to each scale in this linear motion rolling guide unit, detection portions 37 and 38 may be small components composed only of electromagnetic conversion devices and can be arranged in a dispersed manner. This also makes it easy to reduce the size of the linear motion rolling guide unit.

In addition, in the case of changing the detection resolution, since all that is required is to adjust the prescribed distance between electromagnetic conversion devices 51 and 52 of the detecting portions corresponding to scales 31 to match the resolution of the detected portions of the scales having the new resolution, this linear motion rolling guide unit is able to flexibly accommodate the particular conditions of use. Moreover, since there is no need to replace the electromagnetic conversion devices 51 and 52 with new ones each time resolution is changed, costs can be reduced.

In addition, since each scale 31 is arranged at symmetrical locations in track rail 21 in this linear motion rolling guide unit, the amount of space that is occupied can be reduced, thereby making it easier to reduce the size of this linear motion rolling guide unit.

Next, an explanation is provided of a second embodiment of the linear motion rolling guide unit according to the present invention. Since this second embodiment has a constitution that is similar to that of the first embodiment with the exception of the portions explained below, the explanation of the constitutions and operations that are the same will be omitted, and the explanation will only cover the essential portion. In addition, the same reference numerals are used for those constituents of the second embodiment that are identical or correspond to those of the first embodiment. This will also apply similarly to all following embodiments to be described later.

Figure 8:
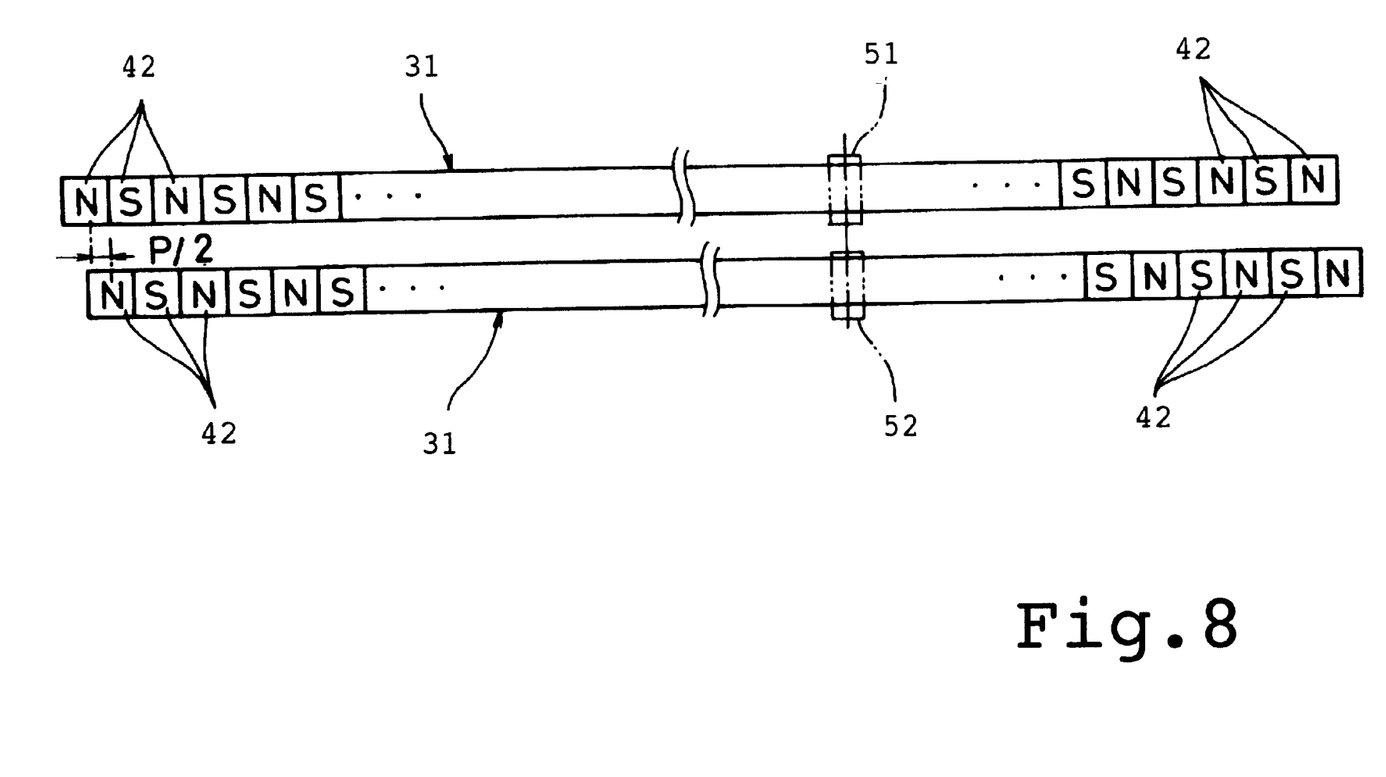
FIG. 8 is an overhead view of a detection device equipped on a linear motion rolling guide unit as a second embodiment of the present invention.

As shown in FIG. 8, in the linear motion rolling guide unit of the second embodiment, scales 31 identical to those of the first embodiment are respectively installed in two grooves 21e (see FIGS. 2 and 3) formed in track rail 21. In this second embodiment, each magnetic pole 42 of these scales 31 is magnetized mutually offset by a prescribed distance of ½ magnetic pitch P.

In contrast, electromagnetic conversion devices 51 and 52 corresponding to each scale are arranged at identical locations on the slide unit in the lengthwise direction of scales 31.

As a result of employing this constitution, the distance of relative movement and the direction of movement of track rail 21 and slide unit 23 can be detected.

Figure 9:
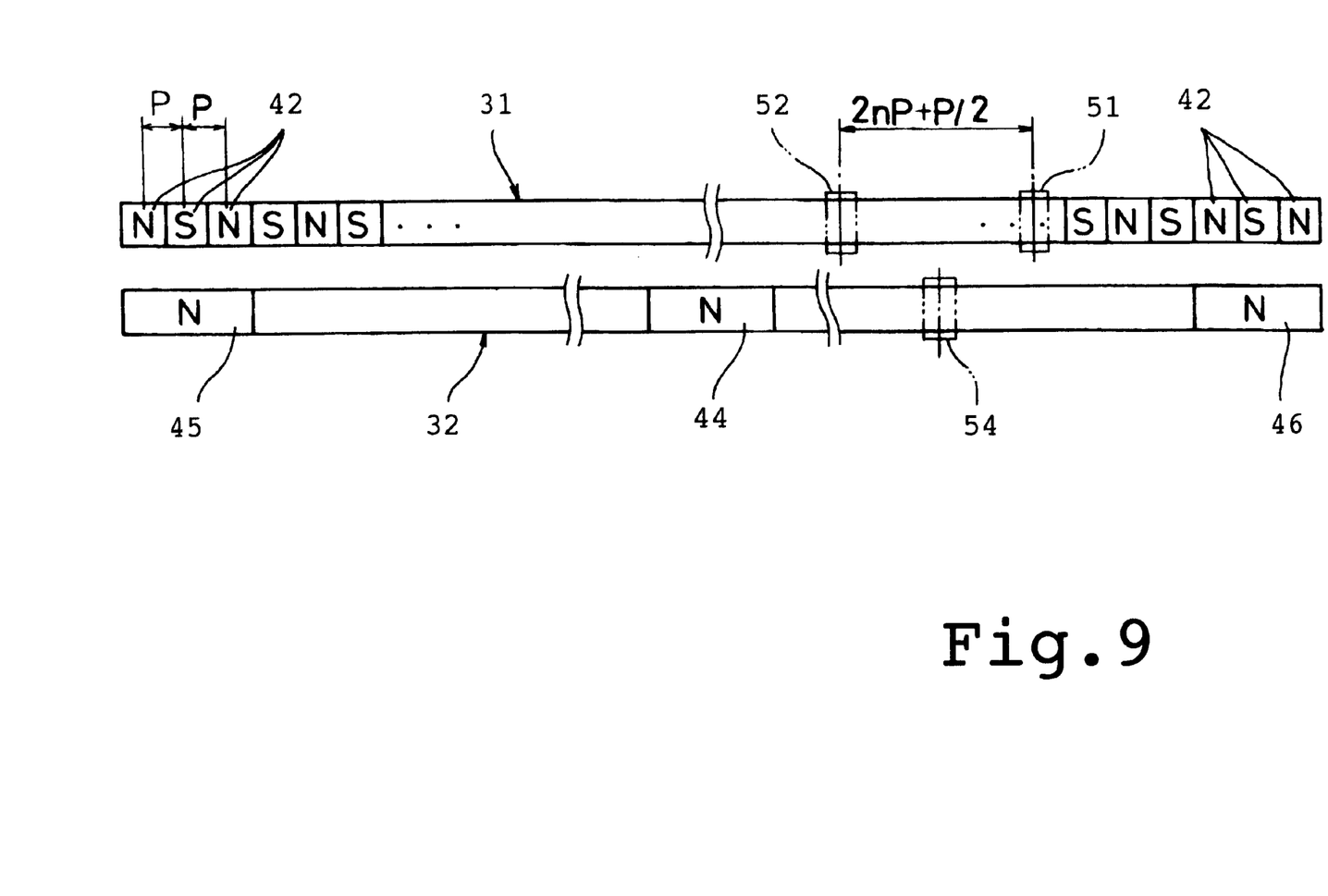
FIG. 9 is an overhead view of a detection device equipped on a linear motion rolling guide unit as a third embodiment of the present invention.

Next, an explanation is provided of a third embodiment of the linear motion rolling guide unit of the present invention using FIG. 9.

In contrast to two scales 31 having the same constitution being provided in the first embodiment of the linear motion rolling guide unit, in this third embodiment, there is only one scale 31, while another scale 32 having a magnetization pattern is provided separately.

Two electromagnetic conversion devices 51 and 52 are provided corresponding to the one scale 31. The prescribed distance between these electromagnetic conversion devices 51 and 52 is set to be 2nP+P/2 if the pitch of magnetic poles 42 of scale 31 is taken to be P. In other words, the prescribed distance between electromagnetic conversion devices 51 and 52 is not limited to P/2 as in the first embodiment, but can be changed as desired by suitably setting the value of n (number of periods) in the third embodiment as necessary.

In addition, in the other scale 32, for example, a single magnetic pole 44 (N or S pole), and two magnetic poles 45 and 46 on both ends are provided in the center of its lengthwise direction in the form of detected portions. Magnetic pole 44 serves as the measurement reference for relative movement of track rail 21 and slide unit 23, while the other two magnetic poles 45 and 46 indicate the limits of the operating stroke.

A single magnetic sensor, and more specifically magnetic resistance (MR) device 54, is provided corresponding to this scale 32. This magnetic resistance device 54 senses magnetic pole 44 as the origin and emits a reference position signal.

In this embodiment, the detected portions of one scale 32 of the two scales 31 and 32 are used to indicate the measurement reference and operating stroke limits of the relative movement of track rail 21 and slide unit 23.

Thus, together with the scales themselves being of an extremely narrow and linear shape, this allows the linear motion rolling guide unit to achieve a further reduction in size.

Furthermore, at least either a magnetic pole 44 for the measurement reference or magnetic poles 45 and 46 for limitation of the operating stroke may be provided as necessary on scale 32.

Figure 10:
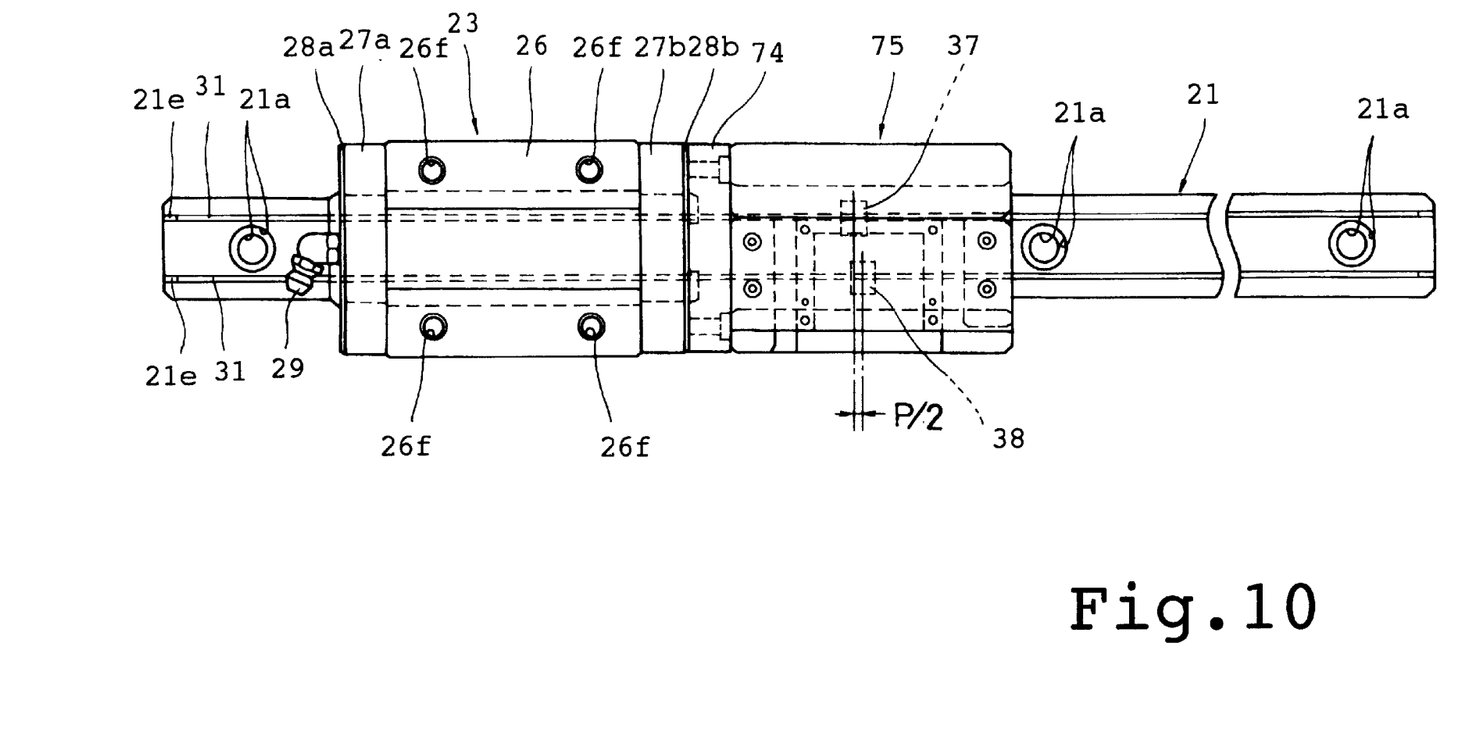
FIG. 10 is an overhead view of the essential portion of a linear motion rolling guide unit as a fourth embodiment of the present invention.

FIG. 10 indicates a linear motion rolling guide unit as a fourth embodiment of the present invention.

This linear motion rolling guide unit has a constitution nearly identical to the first embodiment (see FIG. 2) with the exception of the detecting portions having an encoder being attached outside slide unit 23. This linear motion rolling guide unit is larger than that of the first embodiment, however.

This embodiment has sensor unit 75 composed in nearly the same manner as slide unit 23 and coupled by means of spacer 74 to one end of slide unit 23. Detecting portions 37 and 38 are installed in this sensor unit 75.

This external type does not require any processing to be performed on slide unit 23. In the first embodiment, although a slight amount of processing is required such as forming grooves 21e shown in FIG. 2, the detecting portions (indicated with reference numerals 37 and 38) are contained within slide unit 23 enabling the overall form to be more compact, which is effective in reducing size.

Figure 11:
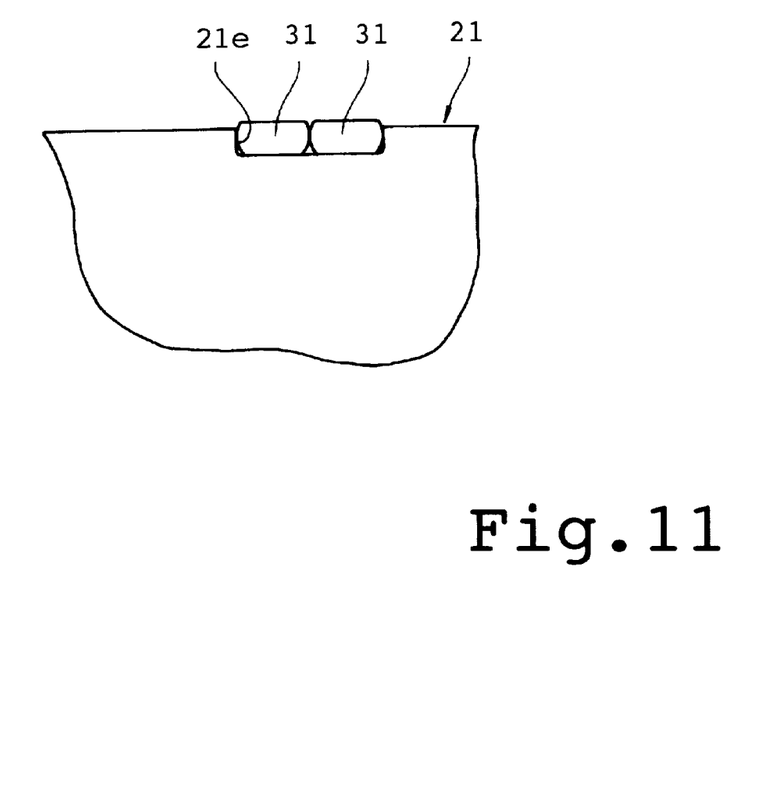
FIG. 11 is a front view showing a variation of the portion relating to the scale of the present invention.

Furthermore, although one detected portion each in the form of a scale is provided in the above-mentioned grooves of the track rail corresponding to each electromagnetic conversion device 51 and 52 or magnetic resistance device 54 (see FIG. 9), as shown in FIG. 11, increased amplification gain can be achieved by arranging two or more of the same type of scales in parallel.

In addition, in the case of providing a plurality of scales in the above manner, for example, one of the scales may be used as a dummy scale without magnetizing, and then either replacing with the required magnetized scale as the need arises, or newly performing the required magnetization on said dummy scale itself.

Figure 12:
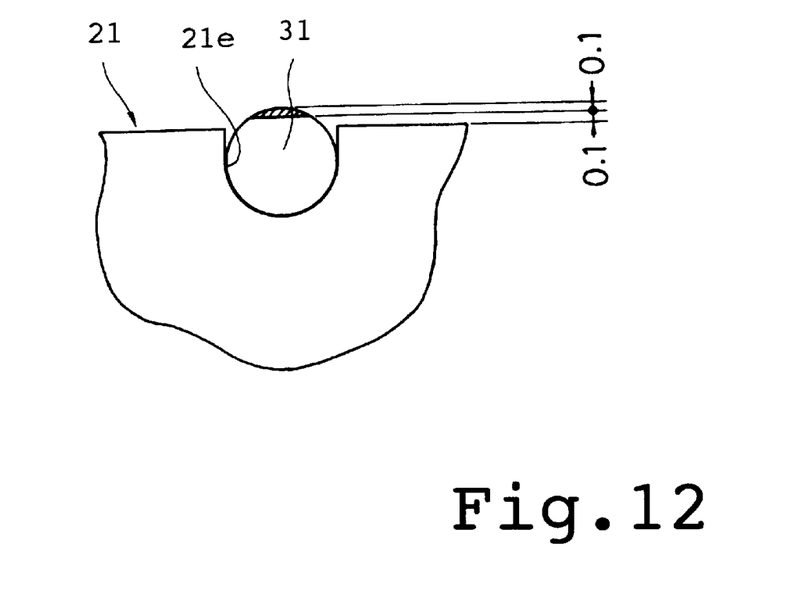
FIG. 12 is a front view showing another variation of the portion relating to the scale of the present invention.

In addition, although the scales used in each embodiment have a flat cross-section, as shown in FIG. 12, a linear member having a circular cross-section may be used as scale 31. In this case, it is preferable that grooves 21e formed in track rail 21 be U-shaped. However, the flat scale used in each of the embodiments offers advantages including increasing the lines of magnetic flux that cross the corresponding magnetic resistance device.

Moreover, although scale 32 (shown in, for example, FIG. 9) for serving as the measurement reference (origin) and limiting the operating stroke (limit positions) provided in the third embodiment (see FIG. 9) is formed to have a long shape in the same manner as scale 31 for position detection, since the layout of the measurement reference and operating stroke limits varies according to the application, this scale 32 may be made to be short, and its position may be able to be changed as necessary.

In addition, the present invention is not limited to the constitutions of each of the embodiments described above, but is able to realize a diverse range of constitutions by mutually combining or applying the constitutions included in each of these embodiments.

Since the linear motion rolling guide unit according to the present invention employs narrow, linear scales, it requires little space for installation and offers a larger degree of freedom in selecting the installation site, while also offering the advantage of enabling the overall size of the linear motion rolling guide unit to be easily reduced. In particular, installation on a track rail is easy due to its linear shape.

In addition, since the linear scales are arranged in the grooves provided in the track rail, the curvature of the scales can be inhibited to ensure accuracy in use as scales if the grooves are formed with high precision.

In addition, in the linear motion rolling guide unit according to the present invention, a plurality of scales are provided at different locations, and detecting portions are separately provided corresponding to each of those scales. Thus, in addition to offering a greater degree of freedom in selecting the installation locations of the scales as mentioned above, each of the detecting portions may be composed to be small, each consisting only of, for example, single electromagnetic conversion devices or magnetic resistance devices (MR devices), and since they are arranged in a dispersed manner, they take up little space thereby making it easy to reduce the size of the guide unit.

In addition, in the case of changing the detection resolution, since all this is required is to adjust the prescribed distance between detecting portions corresponding to the scales to match the resolution of the scales having the new resolution, the present invention is able to flexibly accommodate the particular conditions of use. Moreover, since there is no need to replace the detecting portions themselves with new ones each time resolution is changed, costs can be reduced.

What is claimed is:

1. A linear motion rolling guide unit comprising:
   a track rail in which tracks are formed along a lengthwise direction;
   a slider having rolling element circulating paths that include load bearing tracks corresponding to the tracks of the track rail, and which is able to move freely relative to the track rail; and,
   a plurality of rolling elements that are arranged and contained within the rolling element circulating paths, and which bear the load while rolling over the tracks of the track rail;

a plurality of grooves formed in the track rail parallel to the tracks of the track rail, a plurality of linear scales, in each of which a detected portion is formed that is magnetized by N and S magnetic poles in a prescribed pattern in the lengthwise direction of the tracks of the track rail, each of the linear scales being respectively arranged in each of the grooves, and detecting portions provided in the slider comprised of magnetic sensors which detect positions of the track rail and the slider, at least one of the magnetic sensors being provided for each of the linear scales.

2. The linear motion rolling guide unit as set forth in claim 1, wherein the N and S magnetic poles of each of the linear scales are magnetized at a fine and mutually equal pitch and at the same locations for each of the linear scales, and the magnetic sensors provided for each of the linear scales are arranged mutually offset by a prescribed distance.

3. The linear motion rolling guide unit as set forth in claim 1, wherein the N and S magnetic poles of each of the linear scales are magnetized at a fine and mutually equal pitch mutually offset by a prescribed distance for each of the linear scales, and the magnetic sensors provided for each of the linear scales are arranged at the same locations.

4. The linear motion rolling guide unit as set forth in claim 1, wherein the detected portion provided on one of the linear scales indicates at least one of a measuring reference and limits of an operating stroke of relative movement of the slider.

5. The linear motion rolling guide unit as set forth in claim 1, wherein the linear scales are arranged at two symmetrical locations the track.

6. The linear motion rolling guide unit as set forth in claim 1, wherein the detecting portions are housed within the slider.

7. The linear motion rolling guide unit as set forth in claim 1, wherein the detecting portions are attached outside the slider.

* * * * *